Oct. 29, 1940.   H. H. SPENCER   2,219,459
POWER PLANT
Filed June 20, 1939
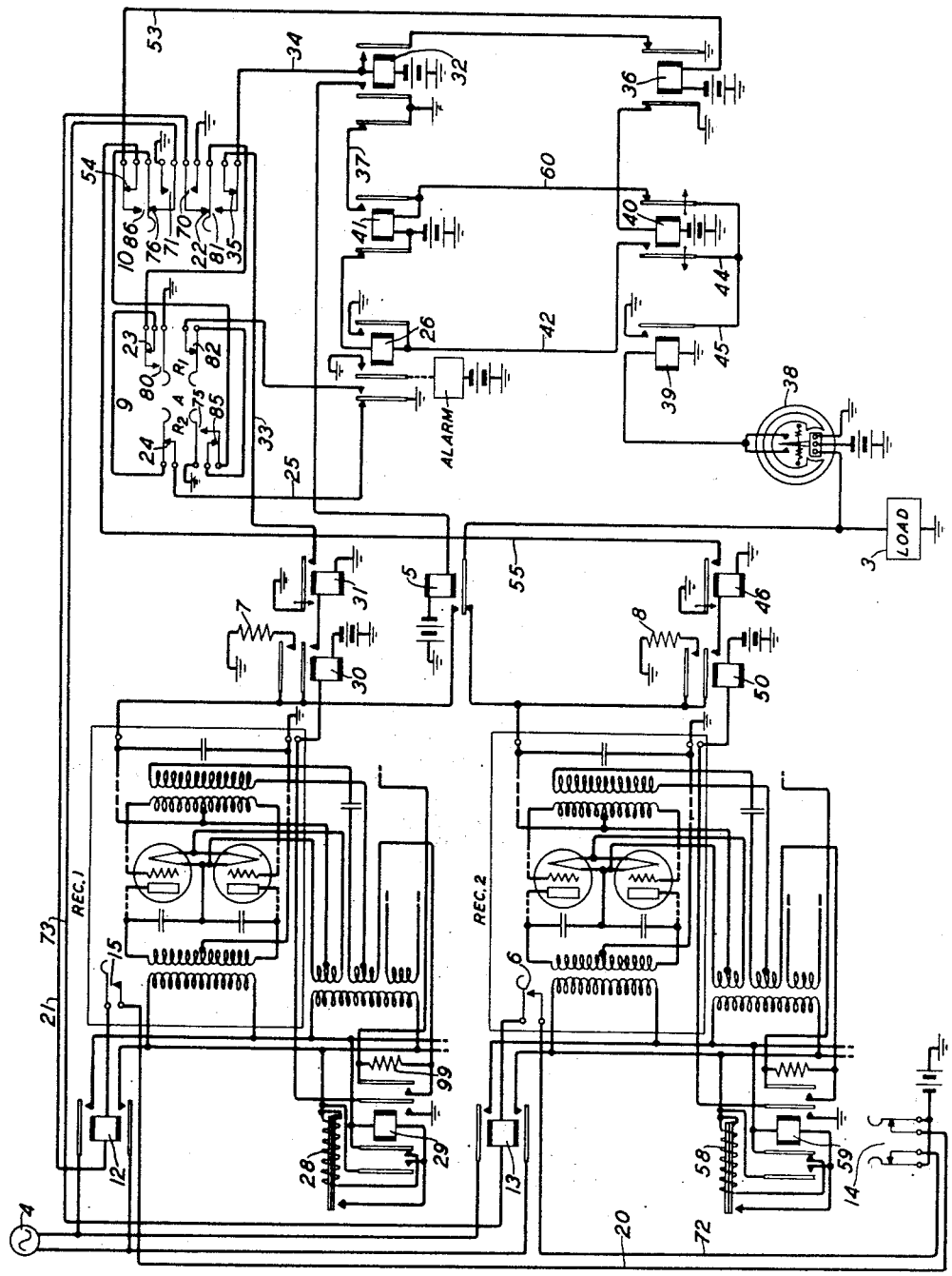
INVENTOR
*H. H. SPENCER*
BY
ATTORNEY Patented Oct. 29, 1940

2,219,459

UNITED STATES PATENT OFFICE 2,219,459

POWER PLANT

Harry H. Spencer, Springfield, N. J., assignor to Bell Telephone Laboratories, Incorporated, New York, N. Y., a corporation of New York Application June 20, 1939, Serial No. 280,030

7 Claims. (Cl. 171—97)

This invention relates to power plants and particularly to such plants wherein gas tube type rectifiers are employed in transferring energy from an alternating current source to a direct current distribution circuit.

It is the object of this invention to supply a plant load with power from an alternating current source through the medium of a regular rectifier and to provide means for manually or automatically transferring the plant load to a spare or standby rectifier in the event of failure of the regular rectifier or under conditions which would warrant such a transfer.

In accordance with a feature of the invention, means under the control of the operating or regular rectifier, functions automatically, should the regular rectifier fail or otherwise prove inadequate to supply the plant load, to prepare the standby rectifier for service and subsequently, to transfer the plant load from the regular rectifier to the standby source of supply.

Another feature of the invention provides for the automatic transfer of the plant load from the regular rectifier to the standby rectifier with the latter already preheated and its output stabilized. This feature eliminates the delay necessary in starting up a cold rectifier to allow for heating the rectifier tube filaments.

A further feature of the invention resides in the use of time delay relays to permit the output of the standby rectifier to become stabilized before the plant load is connected thereto.

A still further feature of the invention contemplates the use of manually operable keys for nullifying the automatic transfer feature and permitting the regular or operating rectifier to be removed from service for repair, etc., and the standby rectifier to be prepared for assuming the load.

These and other features of the invention will be readily understood from the following detailed description made with reference to the accompanying drawing which constitutes a circuit diagram of a power plant involving two grid-controlled rectifiers which serve to transfer energy from an alternating current supply to a direct current distribution circuit, and the switching instrumentalities which operate to provide the features of the invention.

Before entering into the detailed description of the operation of the system disclosed, a brief reference to the essential equipment of which the power plant is composed will be made. The power plant receives its power from a local alternating current source which is transferred to the plant load through the medium of two rectifiers. The rectifiers are schematically represented by the blocks designated REC1 and REC2, respectively. These rectifiers, in themselves, do not constitute a part of the present invention and may be of any well-known type. However, the disclosure is intended to illustrate grid-controlled rectifiers of the gas-filled tube type, such as disclosed and described in Patent 2,155,515, issued April 25, 1939. Just enough of the rectifier equipment is disclosed as appears necessary for a complete understanding of the control system which functions with the rectifiers. At 3 there is schematically represented a plant load which may be connected to the output terminals of either rectifier under the control of transfer relay 5. Each rectifier is provided with a dummy load, such as shown at 7 and 8, which serves to stabilize the rectifier output before the plant load is connected to the rectifier. A voltmeter relay 38 is connected in parallel with the load and functions upon failure of the operating rectifier, or when the rectifier operates beyond allowable voltage limits, to control the transfer of the plant load to the standby rectifier. A pair of manually operable keys is shown at 9 and 10, the first having a normal position and two alternate positions and the latter having a normal position and one alternate position. The normal position of key 9 insures the automatic control of the load transfer feature, whereas its two alternate positions, designated R1 and R2, respectively, are utilized when it becomes desirable to manually transfer the load from a working rectifier to the standby rectifier and to prevent subsequent transfer to the idle rectifier in the event it is being inspected, overhauled or otherwise worked upon. The key 10, hereinafter referred to as the "idle rectifier" key is utilized to cause the filaments of the standby or idle rectifier tubes to be preheated and the rectifier output stabilized in anticipation of the transfer of the plant load thereto. This feature is particularly desirable in that the idle rectifier is fully prepared to assume the load immediately, thereby eliminating the delay necessary in starting up a cold rectifier to allow for heating the rectifier tube filaments. Each rectifier is provided with a slow-to-operate relay, such as relays 31 and 46 which, under automatic operation, functions to delay the load transfer until the output of the rectifier to which the load is to be transferred has become stabilized. A switch 14 is furnished each power plant and serves to supply battery to relays 12 and 13 which, when operated, connect the rectifier input circuits and tube filaments to the alternating current source.

The power plant illustrated in the drawing may be placed in operation with either rectifier as the regular supply and with the other as the standby source.

It will be observed that with the plant unoperated, that is, with switch 14 in its "off" position, neither rectifier would be functioning, so that both relays 31 and 46 would be unoperated and the armature of voltmeter relay 38 would be resting on its low voltage contact, since the voltmeter relay would be connected across one or the other rectifier, neither of which is functioning. Under this condition relay 39 is held operated in an obvious circuit. Relays 32 and 36 would be unoperated since their operating circuits are open at the armatures and front contacts of relays 31 and 46, respectively. Relay 40 would be operated to ground at the left armature and back contact of relay 36. With relay 40 operated, ground from the armature and front contact of relay 39 finds a path to relay 26 by way of conductors 45 and 44, left armature and front contact of relay 40, conductor 42, winding of relay 26 and thence to grounded battery by way of the left armature and back contact of relay 41. Relay 26, therefore, would be operated, and its outer left armature would be resting on its front contact to connect ground to one side of relay 13 by way of the normal contacts 82 and 85 of key 9, normal contacts 76 of key 10, and conductor 73. Obviously, therefore, should the key 14 be actuated to its "on" position (illustrated), relay 13 would operate to cause rectifier REC2 to start operating.

If it is desirable to operate the plant with rectifier REC1 as the regular source and REC2 as the standby source, the following procedure is resorted to: "idle rectifier" key 10 is actuated, then key 9 is actuated to the left or R2 position, key 10 is then restored, key 9 next is restored, and finally key 14 is actuated to its "on" or battery connecting position. When key 10 is actuated, ground at contacts 70 and 71 is connected to conductors 21 and 73 leading respectively to relays 12 and 13. These relays, however, do not function as the battery switch 14 is in its "off" position. At contact 54 the normal circuit to relay 36 is opened and at contact 35 the normal circuit to relay 32 is opened.

It will be observed that a circuit now exists which extends from grounded battery winding of relay 36, conductor 53, contacts 86 of key 10 (operated), contacts 85 and 82 of key 9 (unoperated) to ground at the front contact and outer left armature of relay 26. Relay 36 operates in this circuit to cause the release of relay 40 which in turn establishes an energizing circuit for relay 41 which extends from grounded battery, winding of relay 41, conductor 60, back contact and right armature of relay 40, conductor 45 to ground at the front contact and armature of relay 39. Relay 41 operates and, at its left armature, opens the locking circuit for relay 26, which relay thereupon restores its armatures. Relay 41 locks to ground on the outer left armature of relay 32 by way of its own right armature and front contact and conductor 37. Now, with relay 26 unoperated, it will be noted that ground connected to its outer left back contact causes relay 32 to operate in a circuit extending from grounded battery, winding of relay 32, conductor 34, contacts 81 of key 10, contacts 23 and 24 of key 9, conductor 25, back contact and outer left armature of relay 26. Relay 32 accordingly operates and locks to ground at the right armature and back contact of relay 36 (now released as a consequence of the release of relay 26). Relay 32 opens the locking circuit for relay 41 causing this relay to restore its armature. The original energizing circuit for relay 26 is accordingly restored by the release of the left armature of relay 41. Relay 26 accordingly reoperates and again connects ground to the winding of relay 36. It is apparent that with key 10 actuated, relay 26 tends to operate and release continuously, thereby connecting ground to its outer left back and front contacts alternately. It is the position of the outer left armature of relay 26 which determines which rectifier is to be used as the regular rectifier. To start the plant with rectifier REC1 as the regular rectifier this armature must rest upon its back contact, in other words, relay 26 must be deenergized when the battery connecting switch 14 is operated, whereas relay 26 must be energized if the rectifier REC2 is to be employed as the regular source.

To furnish a means for selecting either of the rectifiers as the regular source, key 9 is provided. To start on the rectifier REC1, key 9 is actuated to the left or R2 position. Under this condition the lead 25 extending from the outer left back contact of relay 26 is opened at the contacts 24 of key 9 so that relay 32 will no longer operate when relay 26 is released. At contacts 75 of key 9 a permanent ground is connected to the winding of relay 36 so that this relay will be operated. The circuit for relay 36 extends from grounded battery, winding of relay 36, conductor 53, contacts 86 of key 10, contacts 75 of key 9 to ground. Relay 36 operated, and now held operated as long as key 9 is in the R2 position, opens the circuit to relay 40 whereupon this relay restores its armature and at its right armature and back contact completes the energizing circuit for relay 41 to ground at the front contact and armature of relay 39. Relay 41 operates and locks under control of relay 32 and, at its left armature disconnects battery from the winding of relay 26. Relay 26, accordingly, is released and its outer left armature stands on its back contact, which, as will be apparent presently, controls the operation of relay 12 of rectifier REC1.

Keys 10 and 9 are now restored sequentially without further disturbing the released condition of relay 26. When the battery switch 14 is now actuated to its "on" position, relay 12 will operate in a circuit extending from grounded battery, right contacts of key 14, conductor 20, rectifier cover contacts 15, winding of relay 12, conductor 21, contacts 22 of key 10, contacts 23 and 24 of key 9, conductor 25 to the back contact and outer left armature of relay 26. Should it be desirable that the plant be started with rectifier REC2 as the regular source, the keys 10 and 9 would be operated in the sequence above indicated, only that key 9 would be operated to the right or R1 position. This would result in operating relay 26 so that its outer left armature would rest upon its front contact with the result that, when key 14 was actuated to its "on" position, relay 13, and not relay 12, would be operated to render rectifier REC2 operative.

In the following description it will be assumed that it is desirable that rectifier REC1 serve as the regular supply with rectifier REC2 as the standby source and that the above-described sequential operations of keys 9 and 10 have been completed and that panel switch 14 has been actuated to its "on" position.

When key 14 is actuated to its battery connecting position (illustrated) relay 12 operates as above described. It will be noted that the circuit for relay 13 extends to the outer left front contact of relay 26 so that, with relay 26 unoperated, relay 13 cannot operate. Relay 12, however, operates as stated, and in attracting its armatures connects the primary winding of the transformer of REC1 across the alternating current supply 4. The input circuit to the rectifier is accordingly closed. It will now be noted that the heater winding of thermal relay 28 is also connected across the alternating current source by way of the inner left armature and back contact of relay 29, which relay corresponds to relay 53 of the above-identified point. The heater winding imparts heat to the bimetal spring of thermal relay 28 to cause it to gradually approach its associated contact. After an interval of time the bimetal spring closes its contact, thereby connecting the winding of relay 29 across the alternating current supply. During this interval the filaments of the tubes of rectifier REC1 have been heating, since they were effectively connected to the alternating current source 4 when relay 12 operated. Relay 29 operates and in attracting its outer left armature, completes an obvious locking circuit for itself. At its inner left armature relay 29 opens the circuit to the heater winding of thermal relay 28 and, at its inner right armature, completes a circuit for relay 30. At its outer right armature relay 29 effectively closes the phase shift circuit of rectifier REC1 in a manner similar to that described in the above-identified patent. It will be noted that relay 29 corresponds in every respect to and performs the same functions as relay 53 of the hereinbefore-mentioned patent and in addition, completes a circuit for relay 30. This last function has been made possible by the addition of the inner right armature of relay 29 which is not provided in the case of relay 53 of the patent.

As explained in the above-identified patent, the phase shift circuit of the rectifier is maintained opened for a period of time by the action of the thermal relay 28 to permit the filaments of the rectifier to become heated before the rectifier output circuit is effectively completed. This is substantially the case in the present disclosure, though a high resistance 99 is provided across the outer right contacts of relay 29 to allow the rectifier to operate at a small output to charge the rectifier filter condensers slowly to the operating voltage. Relay 30, accordingly, operates only after the rectifier filaments have been heated sufficiently for proper functioning of the rectifier.

When relay 30 operates it connects the dummy load 7 across the output side of the rectifier REC1 and also completes an obvious energizing circuit for slow-to-operate relay 31. After an interval of time, relay 31 operates and establishes a circuit for relay 32 which extends from grounded battery, winding of relay 32, conductor 34, closed contacts 35 of key 10, conductor 33 to ground by way of the front contact and armature of relay 31. Relay 32 operates and, in attracting its right armature, locks up to ground on the right armature and back contact of relay 36. At its outer left armature relay 32 removes ground from the conductor 37 to cause relay 41 to release its armatures. At its inner left armature relay 32 establishes an obvious circuit for transfer relay 5 which relay, in operating, connects the plant load 3 across the output side of rectifier REC1 as well as the winding of voltmeter relay 38. It will be noted that prior to the connection of the load 3 to rectifier REC1, the dummy load 7 has been connected thereto so that the rectifier output has time to become stabilized before actual load transfer occurs. Relay 31 is slow to operate to insure this delay.

The description, up to the present, covers the starting of the power plant and the connection of the plant load to the regular rectifier REC1. It will now be assumed that rectifier REC1, for some reason, fails, or the allowable voltage limits of relay 38 are exceeded. Under these conditions relay 38 functions to close one of its contacts, thereby causing relay 39 to operate in an obvious circuit.

Relay 39, operated, completes an energizing circuit for relay 26 extending from grounded battery on the left armature and back contact of relay 41, winding of relay 26, conductor 42, front contact and left armature of relay 40, conductors 44 and 45 to ground by way of the front contact and armature of relay 39. Relay 26 operates in this circuit and, at its front contact and right armature, locks to the back contact and left armature of relay 41. At its outer left armature, relay 26 opens the circuit to relay 12 and closes a circuit to relay 13 which extends from grounded battery at the left contacts of switch 14, conductor 72, rectifier cover contacts 6, winding of relay 13, conductor 73, contacts 76 of key 10, contacts 85 and 82 of key 9 to ground by way of the front contact and outer left armature of relay 26. Relay 13, operated, connects the alternating current supply to rectifier REC2 whereas relay 12, released, disconnects the alternating current supply from REC1. At its inner left armature relay 26 completes an alarm circuit in which a signal functions to indicate the failure of rectifier REC1.

Upon the operation of relay 13, thermal relay 58 and subsequently relay 59 operate in the same manner as did thermal relay 28 and relay 39 hereinbefore described, and perform the same functions in connection with rectifier REC2 as did those relays with rectifier REC1. When relay 59 actuates its inner right armature, relay 50 operates in an obvious circuit and connects the dummy load 8 and the winding of slow-to-operate relay 46 in parallel across the output of rectifier REC2. It will be noted that the load 3 has not yet been transferred to the rectifier REC2.

With relay 46 operated, relay 36 operates in a circuit extending from grounded battery, winding of relay 36, conductor 53, contacts 54 of key 10, conductor 55 to ground by way of the front contact and armature of relay 46. At its left armature relay 36 opens the energizing circuit for relay 40 and, at its right armature, opens the locking circuit for relay 32. Relays 32 and 40 thus restore their armatures to normal. At its inner left armature relay 32 opens the circuit for transfer relay 5 whereupon this relay releases its armature and thus transfers the plant load 3 from rectifier REC1 to REC2. Relay 40 is a slow-to-release device and by the time it has made its back contact, relay 39 would have released its armature due to the fact that relay 38 would have returned its armature to an intermediate position as a consequence of the connection of relay 38 to the output side of rectifier REC2 effected by the release of relay 5. The circuit for relay 41 is, therefore, maintained open and the locking circuit for relay 26, therefore, insured.

It is apparent from the foregoing description that the operations incident to the failure of rectifier REC1 take place in a definite sequence. First, the power supply is disconnected from the rectifier REC1 and connected to the input side and filaments of rectifier REC2; after the filaments of rectifier REC2 have been heated, the dummy or stabilizing load 8 and slow-to-operate relay 46 are connected to the output side of rectifier REC2 and finally, as a consequence of the delayed operation of relay 46, the plant load is transferred from the output side of rectifier REC1 to the output side of rectifier REC2. Thus it will be observed that the filaments of the rectifier to which the plant load is to be transferred are heated first, then the output of the standby rectifier REC2 is stabilized and thereafter the load transfer is effected.

With rectifier REC2 operating and supplying the load, should the voltage limits of relay 38 again be exceeded, relay 39 would again operate to cause relay 41 to operate in a circuit extending from grounded battery, winding of relay 41, conductor 60, back contact and right armature of relay 40, conductor 45 to ground by way of the front contact and armature of relay 39. Relay 41 operates and, in attracting its right armature, locks to ground at the outer left armature and back contact of relay 32. At its left armature relay 41 removes battery from the winding of relay 26, causing relay 26 to restore its armatures, thereby releasing relay 13 and reoperating relay 12. Thus rectifier REC2 is cut off from the alternating current supply and rectifier REC1 is reconnected thereto.

During the operation of rectifier REC1, it may become desirable to preheat rectifier REC2 in contemplation of a transfer of the load 3 from rectifier REC1 to rectifier REC2, in order to eliminate the delay necessary in transferring to a cold rectifier. To accomplish this, the "idle rectifier" key 10 is actuated. It will be noted that though the energizing circuit for relay 12 includes the normal contacts 22 of key 10, which are now opened by the operation of key 10, ground at contacts 70 of key 10 is substituted for the ground on the upper armature of relay 26. Hence, though key 10 is operated, an operating circuit for relay 12 is maintained by way of contacts 70 so that the operation of rectifier REC1 is not interfered with. At contacts 71 of key 10 a circuit for relay 13 of rectifier REC2 is completed which may be traced from grounded battery, left contacts of key 14, conductor 72, rectifier cover contacts 6, winding of relay 13, conductor 73 to ground on the contacts 71 of key 10. Relay 13 thereupon functions as hereinbefore described to start the heating of rectifier REC2. When relay 50 operates, the dummy load 8 is connected to the output terminals of rectifier REC2. Thus both rectifiers are operating, one carrying the plant load 3 and the other carrying only its dummy load. The output of rectifier REC2 is thus stabilized and the rectifier is prepared to immediately assume the plant load. Should rectifier REC1 now fail, the plant load 3 would be transferred to rectifier REC2 immediately.

If during the operation of rectifier REC1 it becomes desirable to effect the manual transfer of the plant load 3 to rectifier REC2 and prevent automatic transfer back to rectifier REC1 while the latter rectifier is being worked upon, such a contingency is provided for and would be taken care of by the operation of key 9 to the left, or R2 position. Upon the operation of key 9 to the R2 position, contacts 24 of the key are opened, thus removing ground at the back contact and outer left armature of relay 26 from the winding of relay 12, whereupon this relay releases its armatures and disconnects rectifier REC1 from the alternating current source. At contacts 75 of key 9, ground is connected to the winding of relay 13 by way of contacts 76 of key 10 and conductor 73. Rectifier REC2, accordingly, is connected to the alternating current supply by way of the armatures and front contacts of relay 13. As previously described, relay 46 operates when rectifier REC2 is functioning, so that relay 36 operates in a circuit extending from grounded battery, winding of relay 36, conductor 53, contacts 54 of key 10, conductor 55 to ground by way of the front contact and armature of relay 46. Relay 36 in operating opens the locking circuit for relay 32, whose normal operating circuit is already open at the armature and contact of relay 31, so that relay 32 restores its armatures, causing the operating circuit for relay 5 to be opened. Relay 5 accordingly restores its armature and thus connects the plant load 3 to rectifier REC2. When relay 36 operates, relay 40 also releases its armatures. Should rectifier REC2 now fail, or exceed the voltage limits of relay 38, relay 39 would again operate as previously described due to the functioning of relay 38. Should the condition be one of exceeding the voltage limits of relay 38 and not of failure of rectifier REC2, relay 46 would still be operated as would also relay 36, and relay 40 would be released. The operation of relay 39 now connects ground to conductor 45 and thence to the winding of relay 41 by way of the right armature and back contact of relay 40, so that relay 41 operates to remove battery from the winding of relay 26. Though relay 26 restores its armatures and, at the outer left one thereof connects ground to conductor 25, relay 12 does not operate since the conductor 25 is now open at contacts 24 of key 9. Hence, there is no automatic transfer effected with the key 9 operated to the R2 position when rectifier REC2 exceeds the voltage limits of relay 38.

Though applicant has illustrated only a resistance load 3 it is to be understood that his control system functions equally well and in the same manner when a battery is used in conjunction with the load.

What is claimed is:

1. In a power plant, an alternating current supply, a plant load, a rectifier supplying said plant load with power from said supply, a second rectifier, means responsive to the failure of said first rectifier for disconnecting said first rectifier from said supply and connecting said second rectifier thereto, stabilizing means for said second rectifier, means effective a predetermined period of time after the connection of said second rectifier to said supply for connecting said stabilizing means to the output terminals of said rectifier, and means operating a predetermined period of time after the connection of said stabilizing means to said second rectifier to cause the transfer of said plant load from said first rectifier to said second rectifier.

2. In a power plant, an alternating current source, a plant load, a rectifier supplying said plant load with power from said source and including a pair of vapor electric devices each having filament, plate and grid electrodes, a second rectifier also including a pair of vapor electric devices each having filament, plate and grid electrodes, means responsive to the failure of said first rectifier for causing the disconnection of said first rectifier from said source and the connection of said second rectifier and its filaments thereto, a dummy load, means effective a predetermined interval of time after the connection of the filaments of said second rectifier to said source for connecting said dummy load to the output side of said second rectifier and means operating a predetermined period of time after the connection of said dummy load to said second rectifier for causing the transfer of said plant load from said first rectifier to said second rectifier.

3. In a power plant, an alternating current source, a plant load, a rectifier supplying said plant load with power from said source, a second rectifier including a vapor electric device having a filament, stabilizing means for said second rectifier, manually operable means for connecting said second rectifier and its filament to said alternating current supply in parallel with said first rectifier whereby the filament of said second rectifier is preheated, means operating a predetermined period of time after the connection of said second rectifier to said alternating current supply for connecting said stabilizing means to the output side of said second rectifier to stabilize the output thereof, and means operating automatically upon the failure of said first rectifier for transferring the plant load from said first rectifier to said second rectifier.

4. In a power plant, an alternating current source, a plant load, a pair of rectifiers either of which may be selected to transfer energy from said source to said plant load, a relay having an armature operable between a front and a back contact, said back contact corresponding to one of said rectifiers and said front contact corresponding to the other of said rectifiers, manually operable means for causing the armature of said relay to alternately engage its front and back contacts and other manually operable means for selectively causing the armature of said relay to come to rest upon one of its contacts whereupon the corresponding rectifier is selected to transfer energy from said source to said plant load.

5. In a power plant, an alternating current source, a plant load, a pair of rectifiers either of which may be selected to transfer energy from said source to said load, a relay having an armature operable between a front and a back contact, said front contact corresponding to one of said rectifiers and said back contact corresponding to the other of said rectifiers, a pair of keys and means responsive to the operation of said keys in a definite sequence for causing the armature of said relay to alternately engage its front and back contacts and subsequently come to rest selectively upon one of said contacts whereupon the corresponding rectifier is selected to transfer energy from said source to said plant load.

6. In a power plant, an alternating current source, a plant load, a pair of rectifiers, either of which may be selected to transfer energy from said source to said plant load while the other acts as a standby rectifier, said rectifiers being of the vapor electric type having filaments, a pair of manually operable switches, means responsive to operation and release of said switches in a predetermined sequence for selecting one of said rectifiers to transfer energy from said source to said load, means effective during the operation of the selected rectifier and responsive to a subsequent operation of but one of said switches for connecting the other of said rectifiers to said alternating current source to preheat the filaments thereof, means operating a predetermined interval of time after the connection of said other rectifier to said alternating current source for stabilizing the output of said other rectifier and means responsive to a failure of the selected rectifier for immediately transferring the plant load from the selected rectifier to said other rectifier whereby said plant load receives energy from said source without substantial interruption upon failure of the selected rectifier.

7. In a power plant, an alternating current source, a plant load, a pair of rectifiers, either of which may be selected for transferring energy from said source to said load, means for selecting a particular one of said rectifiers to transfer energy from said source to said load, means operating automatically upon failure of the selected rectifier to transfer the plant load from the selected rectifier to the other rectifier and means for manually transferring the plant load from the selected rectifier to the other rectifier and preventing the automatic transfer of the plant load back to the selected rectifier upon failure of the other rectifier.

HARRY H. SPENCER.